United States Patent [19]

Kono et al.

[11] Patent Number: 4,881,959

[45] Date of Patent: Nov. 21, 1989

[54] EXHAUST EMISSION PURIFIER FOR DIESEL ENGINES

[75] Inventors: Yoichiro Kono, Tokyo; Yasuaki Kumagai, Yokohama; Nobuaki Takeda, Kawasaki; Hiroshi Ogita, Yokohama, all of Japan

[73] Assignee: Mitsubishi Jidosha Kogyo Kabushiki Kaisha, Tokyo, Japan

[21] Appl. No.: 221,091

[22] Filed: Jul. 19, 1988

[30] Foreign Application Priority Data

| | | | |
|---|---|---|---|
| Jul. 20, 1987 | [JP] | Japan | 62-110991[U] |
| Oct. 20, 1987 | [JP] | Japan | 62-159272[U] |
| Oct. 20, 1987 | [JP] | Japan | 62-159273[U] |

[51] Int. Cl.[4] .............. B01D 46/10

[52] U.S. Cl. .............. 55/267; 55/523; 55/DIG. 10; 55/DIG. 30

[58] Field of Search .............. 55/96, 208, 267, 523, 55/DIG. 10, DIG. 30

[56] References Cited

U.S. PATENT DOCUMENTS

| | | | |
|---|---|---|---|
| 4,270,936 | 6/1981 | Mann | 55/523 X |
| 4,346,557 | 8/1982 | Shadman et al. | 55/523 X |
| 4,427,418 | 1/1984 | Kogiso et al. | 55/523 X |
| 4,456,457 | 6/1984 | Nozawa et al. | 55/487 X |
| 4,523,935 | 6/1985 | Takagi et al. | 55/DIG. 10 |
| 4,535,589 | 8/1985 | Yoshida et al. | 55/DIG. 10 |
| 4,544,388 | 10/1985 | Rao et al. | 55/DIG. 10 |
| 4,549,398 | 10/1985 | Oishi et al. | 55/DIG. 10 |
| 4,662,911 | 5/1987 | Hirayama et al. | 55/523 X |
| 4,695,429 | 9/1987 | Lupoli et al. | 55/DIG. 10 |
| 4,696,827 | 8/1987 | Wade et al. | 55/DIG. 30 |
| 4,730,454 | 3/1988 | Pischinger et al. | 55/DIG. 30 |
| 4,744,216 | 5/1988 | Rao et al. | 55/DIG. 30 |

FOREIGN PATENT DOCUMENTS

| | | | |
|---|---|---|---|
| 58-202014 | 11/1983 | Japan | 55/523 |
| 59-019517 | 2/1984 | Japan | 55/DIG. 10 |

*Primary Examiner*—Robert Spitzer

*Attorney, Agent, or Firm*—Oblon, Spivak, McClelland, Maier & Neustadt

[57] ABSTRACT

An exhaust emission purifier for a diesel engine has a particulate trap disposed in the exhaust emission passage of the diesel engine for entrapping particulates contained in exhaust gases emitted from the diesel engine, the particulate trap being housed in a canning container. An electric heater is disposed in the canning container upstream of the particulate trap for heating the exhaust gases to a temperature which is high enough to burn particulates entrapped by the particulate trap. A heat conductor/converter device disposed in the canning container upstream of the electric heater for absorbing heat radiated from the electric heater and discharging the absorbed heat into air flowing from a position upstream of the canning container into the particulate trap. The heat generated by the electric heater is efficiently utilized to heat the air introduced into the particulate trap for reliably and quickly igniting and burning the entrapped particulates.

15 Claims, 4 Drawing Sheets

EXHAUST EMISSION PURIFIER FOR DIESEL ENGINES

[TECHNICAL FIELD]

The present invention relates to an exhaust emission purifier for use in the exhaust gas passage of a diesel engine, including a particulate trap for trapping the particulates contained in exhaust gases emitted from the diesel engine and an electric heater for heating the exhaust gases to burn the trapped particulates.

[BACKGROUND ART]

Engines such as diesel engines emit particulates contained in exhaust gases, and are associated with a particulate trap disposed in their exhaust gas passage for entrapping the emitted particulates. As the amount of particulates trapped by the particulate trap is increased, the resistance to the flow of exhaust gases through the particulate trap is also increased, and the power output of the engine is lowered. To prevent such a flow resistance increase and an engine power output drop, these engines are also combined with an emission purifier for burning the particulates entrapped by the particulate trap.

The emission purifier burns the trapped particulates with the combustion gases emitted from a burner, or with the heat from an electric heater and supplied air.

Where the electric heater is employed, since the electric heater is energized by a battery on the automobile equipped with the engine, the sufficient amount of electric energy may not be available, for burning the particulates completely in restoring the particulate trap.

SUMMARY OF THE INVENTION

It is an object of the present invention to provide an exhaust emission purifier capable of utilizing the heat generated by a heater efficiently for the burning of trapped particulates, so that the trapped particulates can be burned completely and efficiently with a reduced amount of heat produced by the heater.

To achieve the above object, an exhaust emission purifier for use with a diesel engine includes a heat conductor/converter device disposed between a heater and a canning container for absorbing heat radiated from the heater and discharging the absorbed heat into a gas introduced from an inlet and directed to a particulate trap. The heat absorbed by the heat conductor/converter device and discharged into the gas is effectively utilized to burn the particulates entrapped by the particulate trap.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

An exhaust emission purifier according to an embodiment of the present invention will be described with reference to FIGS. 1 through 5.

Figure 1:
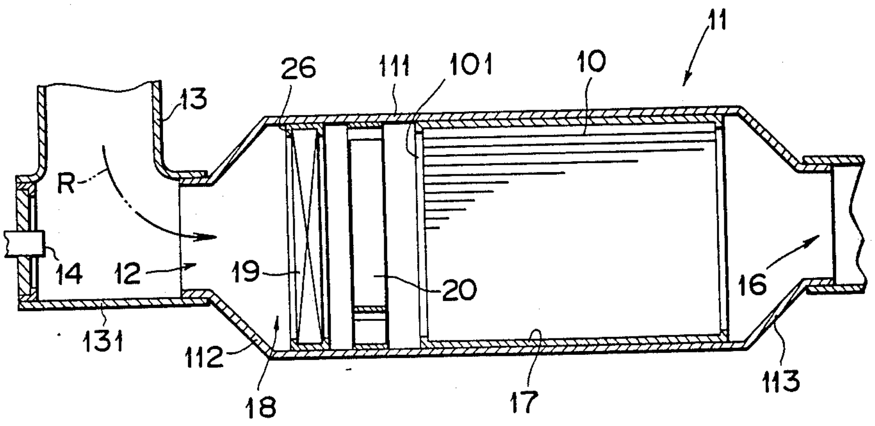
FIG. 1 is a cross-sectional view of an exhaust emission purifier according to an embodiment of the present invention.
Figure 2:
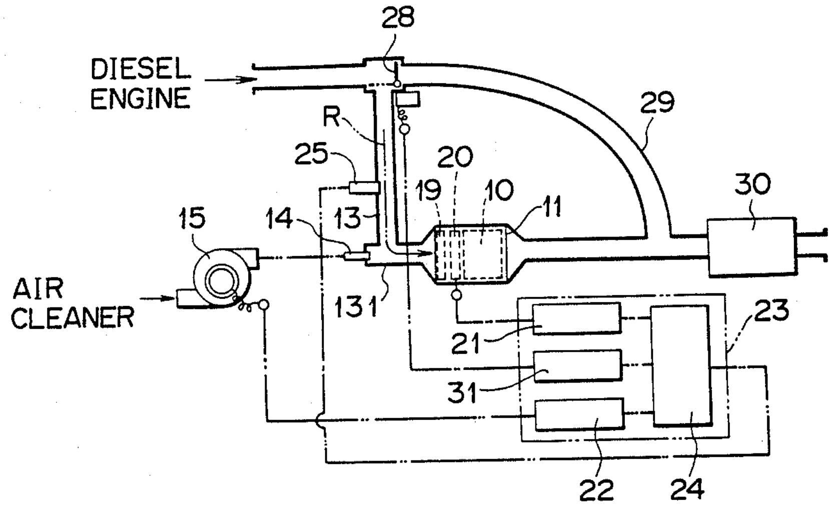
FIG. 2 is a schematic view showing an entire emission control system associated with a diesel engine and incorporating the exhaust emission purifier of the present invention.

The exhaust emission purifier shown in FIG. 1 serves to burn particulates entrapped by a particulate trap 10 disposed in the exhaust passage of a diesel engine (not shown). The particulate trap 10 is disposed in a tubular canning container 11 made of stainless steel. The canning container 11 has an inlet 12 coupled to a straight pipe 131 from which an exhaust pipe 13 is branched toward the engine. As illustrated in FIG. 2, exhaust gases emitted from the engine normally flow through the canning container 11 in a normal mode. In a particulate trap restoring mode, a selector valve 28 is shifted over to direct the emitted exhaust gases through a branch pipe 29 and a muffler 30, from which the exhaust gases are discharged into atmosphere.

The straight pipe 131 has a distal end remote from the inlet 12 and coupled to an air nozzle 14 which draws air from an air cleaner (not shown) into the straight pipe 131 only when an air pump 15 is actuated. The amount of air supplied by the air nozzle 14 is selected to be large enough to burn the entrapped particulates completely, but any excessive supply of wasteful air which would give rise to a shortage of heat generated by a heater (described later) is prevented.

The canning container 11 comprises a tubular barrel 111 including a funnel-shaped connector 112 defining the inlet 12 and a funnel-shaped connector 113 axially opposite to the connector 12 and defining an outlet 16. The particulate trap 10 is mounted centrally in the tubular barrel 111, the particulate trap 10 being constructed of a heat insulating material having a honeycomb structure and supported by an attachment 17 which is capable of absorbing thermally induced deformation of the particulate trap 10. The tubular barrel 111 defines therein a space 18 near the inlet 12, the space 18 accommodating therein a heat conductor/converter device 19 and an electric heater 20 positioned in juxtaposed relation to the heat conductor/converter device 19 just upstream of an entrance end of the particulate trap 10.

The particulate trap 10 is made of a porous material such as ceramics, for example, and is of a cylindrical shape which is slightly smaller in diameter than the canning container 11. The attachment 17 which may be a wire mesh is interposed between the outer peripheral surface of the particulate trap 10 and the inner peripheral surface of the canning container 11 thereby to support the particulate trap 10 in the canning container 11.

Figure 5A:
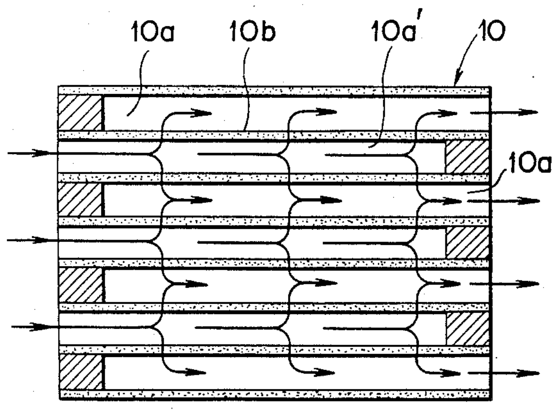
FIGS. 5(*a*) and 5(*b*) are views showing a particulate trap in the exhaust emission purifier.
Figure 5B:
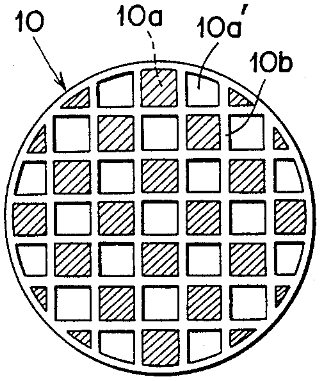

FIGS. 5(*a*) and 5(*b*) show the construction of the particulate trap 10. FIG. 5(*a*) is a longitudinal cross-sectional view of the particulate trap 10, and FIG. 5(*b*) is an end view of the particulate trap 10. The particulate trap 10 has a checked pattern, for example, of multiple passages 10*a* having upstream ends closed and multiple passages 10*a'* having downstream ends closed, the passages 10*a*, 10*a'* extending axially of the particulate trap 10. The passages 10*a*, 10*a'* are divided by porous thin walls 10*b* (FIG. 5(*b*)). Exhaust gases introduced into the particulate trap 10 from the passages 10*a'* which have open upstream ends flow in the passages 10*a'*. Since the downstream ends of the passages 10*a'* are closed, the exhaust gases are forced to pass through the porous thin walls 10*b* into the adjacent passages 10*a* while at the same time particulates contained in the exhaust gases are entrapped by and attached to the porous thin walls 10*b*. After the particulates have been removed, the exhaust gases are discharged from the passage 10*a* with their downstream ends being open.

Figure 3:
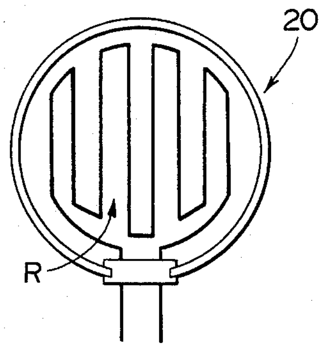
FIG. 3 is a view showing an electric heater in the exhaust emission purifier.

As shown in FIG. 2, the electric heater 10 is electrically connected to a battery (not shown) via a heater driver circuit 21. The heater 10 is of such a shape as to keep a sufficient flow space therein so that the heater 10 does not substantially increase the resistance to a fluid flow through an exhaust emission passage R through the canning container 11. In the illustrated embodiment, the heater 10 comprises a bent heater wire known as a Kantal wire as shown in FIG. 3 for uniformly heating air flowing through the exhaust emission passage R.

Figure 4:
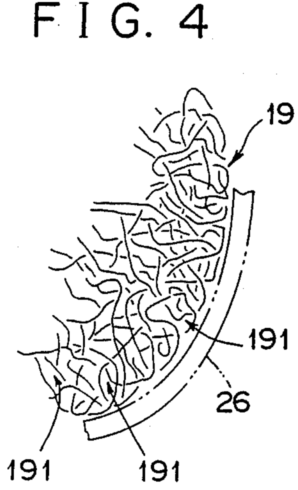
FIG. 4 is an enlarged fragmentary view of a heat conductor/converter device in the exhaust emission purifier.

The heat conductor/converter device 19 is sufficiently permeable to air and has a prescribed thickness. In the illustrated embodiment, the heat conductor/converter 19 comprises thin filaments of a porous ceramic material folded and overlapped on themselves at random into a bulky layer, as illustrated in FIG. 4. The heat conductor/converter device 19 is heated to high temperature by absorbing heat radiated from the heater 20 and directed toward the inlet 12. The heat conductor/-converter device 19 then discharges the absorbed heat into air from the inlet 12 when it flows through exhaust emission passageways 191 in the heat conductor/converter device 19.

The driver circuit 21 for the heater 20, a driver circuit 22 for the motor of the air pump 15, and a driver circuit 31 for the selector valve 28 are controlled by a control circuit 24 in a controller 23. The control circuit 24 determines the time to start a restoring mode based on pressure information sent from a pressure sensor 25 positioned upstream of the particulate trap 10, actuates the heater 20 and the air pump 15 simultaneously for restoring the particulate trap 10. More specifically, the particulate trap 10 starts to be restored in response to an ON signal issued by the control circuit 24 when a prescribed pressure level is detected by the pressure sensor 25.

The heat conductor/converter device 19 is attached to the tubular barrel 111 in the space 18 by a known attachment 26 capable of absorbing thermally induced deformation of the heat conductor/converter device 19.

The exhaust emission purifier operates while the automobile is running, as follows:

While the amount of particulates entrapped by the particulate trap 10 is small, the pressure level detected by the pressure sensor 25 is low, and the heater 20, the air pump 15, and the selector valve 28 are not operated.

As the amount of particulates entrapped from the exhaust gases by the particulate trap 10 is increased, the pressure in the exhaust emission passage R rises. When the detected pressure exceeds a prescribed pressure level, the control circuit 24 energizes the heater 20, actuates the air pump 15, and shifts over the selector valve 28.

The flow of exhaust gases into the exhaust emission passage R is stopped by the selector valve 28 and diverted into the branch pipe 29 and the muffler 30 for discharge into atmosphere. At this time, only fresh air is introduced from the air nozzle into the inlet 12.

While restoring the particulate trap 10, the heat generated by the heater 20 is utilized to burn the particulates near the entrance end 101 of the particulate trap 10. Heat radiation from the heater 20 which is directed to the inlet 12 is received by the heat conductor/converter device 19, and absorbed by the air supplied from the inlet 12. The heated air then flows through the heater 20 to the entrance end 101 of the particulate trap 10 for burning the particulates trapped in the particulate trap 10.

Upon elapse of a prescribed period of time, the control circuit 24 turns off the heater 20 and the air pump 15, and shifts back the selector valve 28 to allow the exhaust gases to flow through the exhaust emission passage R.

As described above, the heat generated by the heater 20, which would otherwise be wasted by being radiated into the front portion of the tubular barrel 111 and the connector 112 and discharged into atmosphere, is effectively utilized for burning the entrapped particulates.

Figure 6:
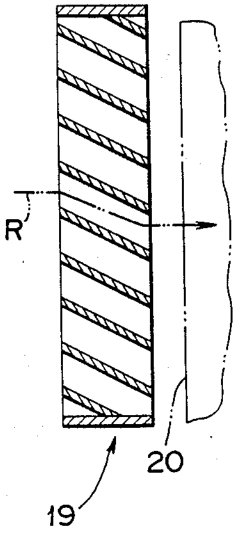
FIGS. 6, 7, 8, and 9 are views illustrating heat conductor/converters according to other embodiments of the present invention.

A second embodiment which is a modification of the heat conductor/converter device 19 described above is shown in FIG. 6. The heat conductor/converter device 19 shown in FIG. 6 is in the form of a louver.

Figure 7:
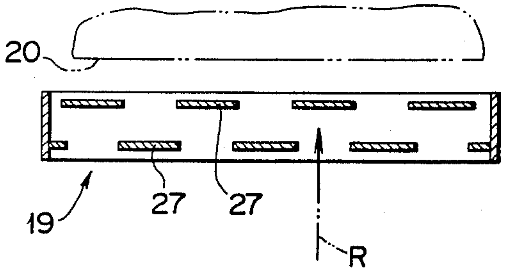

FIG. 7 shows a third embodiment which is also a modification of the heat conductor/converter device 19 of the first embodiment. The heat conductor/converter device 19 shown, in FIG. 7 comprises a plurality of staggered narrow strips 27.

The heat conductor/converter device 19 according to each of the first, second, and third embodiments serves to collect heat which is emitted from the heater 20, but is not directed from the heater 20 to the particulate trap 10, and discharges the collected air into an influx of air. Therefore, the heat generated by the heater 20 can effectively be utilized, prevent the heater 20 from suffering a shortage of heat, and can burn the entrapped particulates completely.

Figure 8:
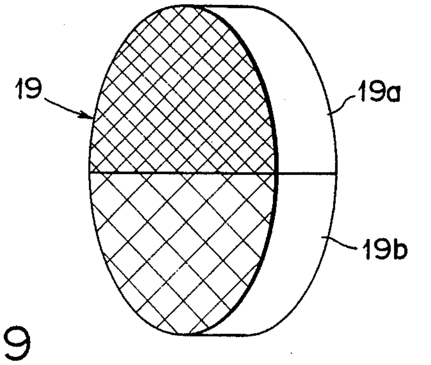
Figure 9:
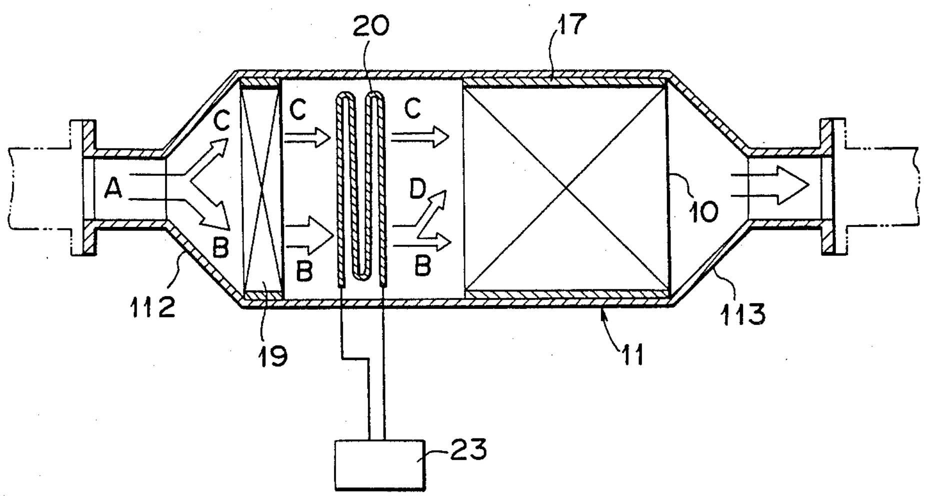

A heat conductor/converter device 19 in accordance with a fourth embodiment of the present invention will be described with reference to FIGS. 8 and 9. The heat conductor/converter device 19 shown in FIG. 8 comprises a porous ceramic body. The porous ceramic material of the heat conductor/converter device 19 is not limited to any particular type, but is preferably cordierite since the heat conductor/converter device 19 is required to be high in heat resistance, chemical resistance, and thermal-shock resistance. As shown in FIG. 8, the heat conductor/converter device 19 is of a honeycomb construction composed of upper and lower semicircular porous ceramic members 19*a*, 19*b* having different mesh sizes, which are joined to each other. The mesh size of the lower porous ceramic member 19*b* is larger than the mesh size of the upper porous ceramic member 19*a*, so that the amount of air flowing through the heat conductor/converter device 19 is greater at the lower member 19*a* than at the upper member 19*b*. Therefore, as shown in FIG. 9, the amount of exhaust gases introduced into the heat conductor/converter device 19 is greater at the lower portion thereof than at the upper portion thereof.

More specifically, the exhaust gases flowing into the canning container 11 along the arrow A first pass through the heat conductor/converter device 19. Since the amount of exhaust gases passing through the lower portion of the heat conductor/converter device 19 as indicated by the arrow B is larger than the amount of exhaust gases flowing through the upper portion of the heat conductor/converter device 19 as indicated by the arrow C, the amount of exhaust gases heated by the heater 20 disposed downstream of the heat conductor/converter device 19 is larger at the lower portion of the heater 20 than at the upper portion of the heater 20.

After having passed through the heat conductor/converter device 19, the exhaust gases are heated by the heater 20 and rise due to natural convection before the heated exhaust gases reach the entrance or upstream end of the particulate trap 10. Inasmuch as the amount of heated exhaust gases having passed through the heater 20 is greater in a lower area than in an upper area, a portion of the lower greater amount of heated exhaust gases rises so that the exhaust gases flowing into the particulate trap 10 are uniformized in quantity distribution over the entire area of the entrance end of the particulate trap 10. Therefore, the exhaust gases of a substantially uniform temperature flow through the passages 10*a*, 10*a'* (FIG. 5) in substantially uniform quantities. As a result, the particulates entrapped in the particulate trap 10 are burned uniformly and efficiently, and the particulate trap 10 is prevented from undergoing thermal stresses.

In the fourth embodiment, the heat conductor/converter device 19 is composed of the upper and lower porous ceramic members 19*a*, 19*b*. However, the heat conductor/converter device 19 may comprise a porous body which is so constructed as to pass exhaust gases in amounts which are progressively greater in a downward direction across the body.

Figure 10:
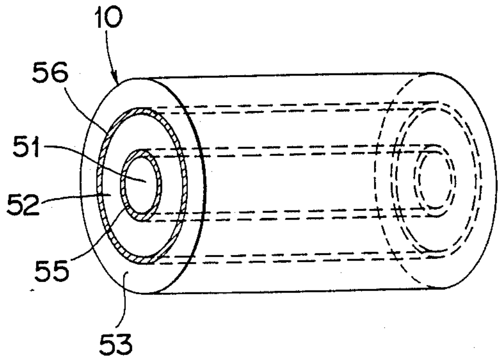
FIGS. 10 and 11 are views showing a particulate trap according to another embodiment of the present invention.
Figure 11:
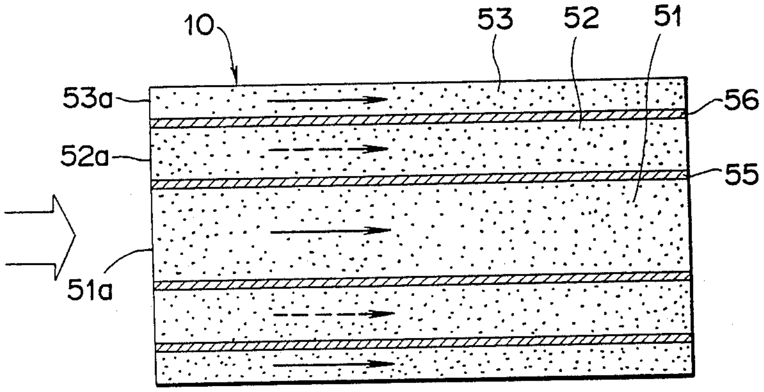

FIGS. 10 and 11 illustrate a fifth embodiment which is a modification of the particulate trap 10 according to the first embodiment. The modified particulate trap 10 comprises a cylindrical filter composed of a plurality (three, for example) of filter elements 51, 52, 53 arranged in concentric relation. The central filter element 51 is in the form of a rod over which the annular filter element 52 is fitted with a small gap or clearance left therebetween. The annular filter element 53 is also fitted over the annular filter element 52 with a small gap or clearance left therebetween. Each of the filter elements 51, 52, 53 is composed of a porous ceramic body of cordierite or the like having a multiplicity of passageways, as with the structure shown in FIGS. 5(*a*) and 5(*b*).

A resilient support member 55 is disposed in the annular gap between the filter elements 51, 52, and another resilient support member 56 is disposed in the annular gap between the filter elements 52, 53. The resilient support members 55, 56 should preferably, but not necessarily, be made of a heat-expansive ceramic material composed of a heat-expanding agent such as vermiculite or the like, ceramic fibers such as of alumina, silica, or the like, and an organic binder. Since the heat-expansive ceramic material is highly resilient and heat-insulative, it is greatly effective in preventing heat from being transferred between the filter elements 51, 52, 53 and also in achieving a uniform temperature distribution. The resilient support members 55, 56 may be interposed between the filter elements 51, 52, 53 only at their axially opposite ends.

Exhaust gases flowing into the canning container 11 (FIG. 1) are heated by the heat conductor/converter device 19 and the heater 20, and the heated gases reach the upstream entrance end of the particulate trap 10 and flow into the filter elements 51, 52, 53 from upstream end surfaces 51*a*, 52*a*, 53*a* thereof. At this time, the heated gases enter the end surfaces 51*a*, 52*a*, 53*a* with a substantially uniform quantity distribution and substantially uniform temperature distribution. Since the heated gases flow through the filter elements 51, 52, 53 to the downstream end surfaces thereof as indicated by the arrows in FIG. 11 while maintaining the uniform quantity distribution and the uniform temperature distribution, the heated gases are prevented from being concentrated in the center of the particulate trap 10. Thus, any temperature gradient in the radial direction of the particulate trap 10 is made small. The entrapped particulates in the particulate trap 10 are therefore fully burned, and hence the heat generated by the heater 20 can effectively be utilized. The particulate trap 10 is prevented from being subjected to thermal stresses because the particulates are uniformly burned.

With the present invention, as described above, the heat produced by the heater 20 is utilized to heat exhaust gases by the heat conductor/converter device 19, and the exhaust gases heated by the heat conductor/converter device 19 are passed through the entire area of the particulate trap 10 to burn the entrapped particulates completely. As a result, the heat generated by the heater 20 is utilized highly efficiently. Even if the electric heater 20 is not supplied with sufficient electric energy from the battery on the automobile, the supplied electric energy can efficiently be utilized for well burning the entrapped particulates to restore the particulate trap 10 sufficiently and smoothly.

Although certain preferred embodiments have been shown and described, it should be understood that many changes and modifications may be made therein without departing from the scope of the appended claims.

What is claimed is:

1. An exhaust emission purifier for use with a diesel engine having an exhaust emission passage, said exhaust emission purifier comprising:

(a) a particulate trap adapted to be disposed in the exhaust emission passage for entrapping particulates contained in exhaust gases emitted from the diesel engine;

(b) a canning container housing said particulate trap;

(c) an electric heater disposed in said canning container upstream of said particulate trap for heating the exhaust gases to a temperature which is high enough to burn particulates entrapped by said particulate trap; and (d) a heat conductor/converter device disposed in said canning container upstream of said electric heater for absorbing heat radiated from said electric heater and discharging the absorbed heat into air flowing from a position upstream of said canning container into said particulate trap, wherein:

(e) said heat conductor/converter device comprises a cluster of exhaust gas passageways and (f) said exhaust gas passageways have a passageway crosssectional area greater in a lower portion of said heat conductor/converter device than in an upper portion of said heat conductor/converter device.

2. An exhaust emission purifier according to claim 1, wherein said heat conductor/converter device comprises a honeycomb structure made of a porous ceramic material.

3. An exhaust emission purifier according to claim 1, wherein:
(a) said heat conductor/converter device comprises filaments of a porous ceramic material folded and overlapped on themselves at random;
(b) said heat conductor/converter device is permeable to air; and
(c) said heat conductor/converter device has a predetermined width.

4. An exhaust emission purifier according to claim 1 and further comprising:
(a) a selector valve connected to said exhaust emission passage upstream of said canning container;
(b) a branch pipe extending from said selector valve in bypassing relation to said canning container;
(c) an air pump;
(d) an air nozzle coupled to said air pump and disposed near an inlet of said canning container for introducing air from said air pump into said heat conductor/converter device;
(e) a pressure sensor disposed in said exhaust emission passage downstream of said selector valve; and
(f) a control circuit for actuating said air pump and energizing said electric heater to burn the entrapped particulates and for operating said selector valve to direct the exhaust gases in bypassing relation to said canning container when a pressure higher than a given pressure level is detected in said exhaust emission passage by said pressure sensor.

5. An exhaust emission purifier for use with a diesel engine having an exhaust emission passage, said exhaust emission purifier comprising:
(a) a particulate trap adapted to be disposed in the exhaust emission passage for entrapping particulates contained in exhaust gases emitted from the diesel engine;
(b) a canning container housing said particulate trap;
(c) an electric heater disposed in said canning container upstream of said particulate trap for heating the exhaust gases to a temperature which is high enough to burn particulates entrapped by said particulate trap; and
(d) a heat conductor/converter device disposed in said canning container upstream of said electric heater for absorbing heat radiated from said electric heater and discharging the absorbed heat into air flowing from a position upstream of said canning container into said particulate trap,
wherein:
(e) said heat conductor/converter device comprises a porous ceramic body having a plurality of exhaust gas passageways;
(f) said heat conductor/converter device is composed of upper and lower members of semicircular cross section; and
(g) said exhaust gas passageways have a passageway cross-sectional area greater in said lower member than in said upper member.

6. An exhaust emission purifier according to claim 5, wherein said heat conductor/converter device comprises a honeycomb structure made of a porous ceramic material.

7. An exhaust emission purifier according to claim 5, wherein:
(a) said heat conductor/converter device comprises filaments of a porous ceramic material folded and overlapped on themselves at random;
(b) said heat conductor/converter device is permeable to air; and
(c) said heat conductor/converter device has a predetermined width.

8. An exhaust emission purifier according to claim 5 and further comprising:
(a) a selector valve connected to said exhaust emission passage upstream of said canning container;
(b) a branch pipe extending from said selector valve in bypassing relation to said canning container;
(c) an air pump;
(d) an air nozzle coupled to said air pump and disposed near an inlet of said canning container for introducing air from said air pump into said heat conductor/converter device;
(e) a pressure sensor disposed in said exhaust emission passage downstream of said selector valve; and
(f) a control circuit for actuating said air pump and energizing said electric heater to burn the entrapped particulates and for operating said selector valve to direct the exhaust gases in bypassing relation to said canning container when a pressure higher than a given pressure level is detected in said exhaust emission passage by said pressure sensor.

9. An exhaust emission purifier for use with a diesel engine having an exhaust emission passage, said exhaust emission purifier comprising:
(a) a particulate trap adapted to be disposed in the exhaust emission passage for entrapping particulates contained in exhaust gases emitted from the diesel engine;
(b) a canning container housed in said particulate trap;
(c) an electric heater disposed in said canning container upstream of said particulate trap for heating the exhaust gases to a temperature which is high enough to burn particulates entrapped by said particulate trap; and
(d) a heat conductor/converter device disposed in said canning container upstream of said electric heater for absorbing heat radiated from said electric heater and discharging the absorbed heat into air flowing from a position upstream of said canning container into said particulate trap,
wherein:
(e) said particulate trap comprises a cylindrical filter composed of a plurality of concentric interfitted filter elements with gaps left therebetween and
(f) resilient support members are disposed respectively in said gaps in at least axially opposite ends of said filter elements.

10. An exhaust emission purifier according to claim 9, wherein:
(a) said filter elements include:
(i) a central rod-shaped filter element;
(ii) an intermediate filter element fitted over said central filter element with a gap therebetween; and
(iii) an outer filter element fitted over said intermediate filter element with a gap therebetween;

(b) each of said filter elements comprises a porous ceramic body having a multiplicity of exhaust gas passageways; and (c) said resilient support members extend respectively in said gaps over the entire length of said filter.

11. An exhaust emission purifier according to claim 9, wherein:

(a) said heat conductor/converter device comprises a cluster of exhaust gas passageways and (b) said exhaust gas passageways have a passageway cross-sectional area greater in a lower portion of said heat conductor/converter device than in an upper portion of said heat conductor/converter device.

12. An exhaust emission purifier according to claim 9, wherein said heat conductor/converter device comprises a honeycomb structure made of a porous ceramic material.

13. An exhaust emission purifier according to claim 9, wherein:

(a) said heat conductor/converter device comprises a porous ceramic body having a plurality of exhaust gas passageways;

(b) said heat conductor/converter device is composed of upper and lower members of semicircular cross section; and (c) said exhaust gas passageways have a passageway cross-sectional area greater in said lower member than in said upper member.

14. An exhaust emission purifier according to claim 9, wherein:

(a) said heat conductor/converter device comprises filaments of a porous ceramic material folded and overlapped on themselves at random;

(b) said heat conductor/converter device is permeable to air; and (c) said heat conductor/converter device has a predetermined width.

15. An exhaust emission purifier according to claim 9 and further comprising:

(a) a selector valve connected to said exhaust emission passage upstream of said canning container;

(b) a branch pipe extending from said selector valve in bypassing relation to said canning container;

(c) an air pump;

(d) an air nozzle coupled to said air pump and disposed near an inlet of said canning container for introducing air from said air pump into said heat conductor/converter device;

(e) a pressure sensor disposed in said exhaust emission passage downstream of said selector valve; and (f) a control circuit;

(i) for actuating said air pump;

(ii) for energizing said electric heater to burn the entrapped particulates; and (iii) for operating said selector valve to direct the exhaust gases in bypassing relation to said canning container when a pressure higher than a given pressure level is detected in said exhaust emission passage by said pressure sensor.

* * * * *